US012436670B2

(12) United States Patent
Duperron

(10) Patent No.: US 12,436,670 B2
(45) Date of Patent: Oct. 7, 2025

(54) MEDIA CONTENT CUSTOMIZATION WITH NON-FUNGIBLE TOKENS

(71) Applicant: DG Holdings, Inc., Salt Lake City, UT (US)

(72) Inventor: Tyler D. Duperron, Maple Ridge (CA)

(73) Assignee: DG Holdings, Inc., Salt Lake City, UT (US)

(*) Notice: Subject to any disclaimer, the term of this patent is extended or adjusted under 35 U.S.C. 154(b) by 241 days.

(21) Appl. No.: 18/200,105

(22) Filed: May 22, 2023

(65) Prior Publication Data

US 2024/0143149 A1 May 2, 2024

Related U.S. Application Data

(60) Provisional application No. 63/421,054, filed on Oct. 31, 2022.

(51) Int. Cl.
*G06F 3/04845* (2022.01)
*G06F 3/0482* (2013.01)

(52) U.S. Cl.
CPC ........ *G06F 3/04845* (2013.01); *G06F 3/0482* (2013.01)

(58) Field of Classification Search
None
See application file for complete search history.

(56) References Cited

U.S. PATENT DOCUMENTS

| | | | |
|---|---|---|---|
| 2009/0235364 A1* | 9/2009 | Cohen | G11B 27/28 726/28 |
| 2020/0242105 A1* | 7/2020 | Rich | H04L 9/40 |
| 2022/0318233 A1* | 10/2022 | Martinez | H04L 9/50 |
| 2022/0398538 A1* | 12/2022 | Jakobsson | H04L 9/3213 |
| 2024/0428306 A1* | 12/2024 | Sliwka | H04L 9/0891 |

* cited by examiner

*Primary Examiner* — Edward Martello
(74) *Attorney, Agent, or Firm* — Foley & Lardner LLP

(57) ABSTRACT

Aspects of this technical solution can include modifying a customizable region of a media object into a customized media object having a modified customizable region, generating, based on a card template having a portion compatible with the media object, a card object corresponding to the card template and including the customized media object embedded in the card object at a location corresponding to the portion of the card template, generating, based on the card object, an NFT including a first identifier of the customized media object and a second identifier of the card template, registering, based on the NFT, the card object to a user account via a block at a blockchain, and linking the NFT with a wallet object corresponding to the user account.

20 Claims, 11 Drawing Sheets

800

```
┌─────────────────────────────────────────────────────────────────┐
│  Modify Customizable Region Of Media Object Into           810  │
│  Customized Media Object                                        │
│  ┌───────────────────────────────────────────────────────────┐  │
│  │  Modify Into Customized Media Object Having          812  │  │
│  │  Modified Customizable Region                             │  │
│  └───────────────────────────────────────────────────────────┘  │
└─────────────────────────────────────────────────────────────────┘
                                │
┌─────────────────────────────────────────────────────────────────┐
│  Generate Card Object Including Customized Media Object    820  │
│  ┌───────────────────────────────────────────────────────────┐  │
│  │  Generate Based On Card Template Having Portion      822  │  │
│  │  Compatible With Media Object                             │  │
│  └───────────────────────────────────────────────────────────┘  │
│  ┌───────────────────────────────────────────────────────────┐  │
│  │  Generate Customized Media Object Embedded In        824  │  │
│  │  Card Object At Location For Portion Of Card Template     │  │
│  └───────────────────────────────────────────────────────────┘  │
│  ┌───────────────────────────────────────────────────────────┐  │
│  │  Generate Card Object Corresponding To Card Template 826  │  │
│  └───────────────────────────────────────────────────────────┘  │
└─────────────────────────────────────────────────────────────────┘
                                │
┌─────────────────────────────────────────────────────────────────┐
│  Generate NFT Based On Card Object                         830  │
│  ┌───────────────────────────────────────────────────────────┐  │
│  │  Generate NFT Including First Identifier Of          832  │  │
│  │  Customized Media Object                                  │  │
│  └───────────────────────────────────────────────────────────┘  │
│  ┌───────────────────────────────────────────────────────────┐  │
│  │  Generate NFT Including Second Identifier Of Card    834  │  │
│  │  Template                                                 │  │
│  └───────────────────────────────────────────────────────────┘  │
└─────────────────────────────────────────────────────────────────┘
```

Fig. 8

MEDIA CONTENT CUSTOMIZATION WITH NON-FUNGIBLE TOKENS

CROSS-REFERENCE TO RELATED PATENT APPLICATIONS

This application claims the benefit of priority under 35 U.S.C. § 119 to U.S. Provisional Patent Application Ser. No. 63/421,054, entitled "NFT-BASED MEDIA CONTENT CUSTOMIZATION," filed Oct. 31, 2022, the contents of such application being hereby incorporated by reference in its entirety and for all purposes as if completely and fully set forth herein.

TECHNICAL FIELD

The present implementations relate generally to non-fungible token (NFT) systems, including but not limited to media content customization with NFTs.

INTRODUCTION

Consumers are increasingly connected to an expanding array of information and demand increasingly varied ways of interacting with and distributing that information. Consumers can access information delivered of the Internet, with various characteristics directed to distribution or meaning. Information can, for example, include "viral" content that has been transmitted by many information consumers, or "meme" content that conveys a particular message relevant to particular information consumers. However, consumers lack ways to produce and transmit information based on viral or meme information, and cannot indicate an authorship or a relationship with viral content or meme content.

SUMMARY

Aspects of this technical solution are directed to high-scale customization of media content and transmission via NFT-based architectures. This technical solution can provide a technical improvement of integrating media content creation with NFT-based distribution to provide secure and personalized media content transmission and storage compatible with any NFT-based wallet container. For example, a technical improvement of this technical solution can include increasing compatibility of an NFT wallet container platform to integrate with individually gifted media content. The gifted media content can include, for example, customized media messages including customized meme or viral content, and can be integrated into a multimedia object corresponding to a greeting card, for example. Thus, a technological solution for NFT-based media content customization is provided.

At least one aspect is directed to a method that can include modifying a customizable region of a media object into a customized media object having a modified customizable region. The method can include generating, based on a card template having a portion compatible with the media object, a card object corresponding to the card template and can include the customized media object embedded in the card object at a location corresponding to the portion of the card template. The method can include generating, based on the card object, an NFT that can include a first identifier of the customized media object and a second identifier of the card template. The method can include registering, based on the NFT, the card object to a user account via a block at a blockchain. The method can include linking the NFT with a wallet object corresponding to the user account.

At least one aspect is directed to a system can include a non-transitory memory and one or more processors. The system can modify a customizable region of the media object into a customized media object having a modified customizable region. The system can generate, based on a card template having a portion compatible with the media object, a card object corresponding to the card template and can include the customized media object. The system can generate, based on the card object, an NFT that can include a first identifier of the customized media object and a second identifier of the card template. The system can register, based on the NFT, the card object to a user account via a block at a blockchain. The system can link the NFT with a wallet object corresponding to the user account.

At least one aspect is directed to a non-transitory computer readable medium can include one or more instructions stored thereon and executable by a processor. The processor can modify, by a processor, a customizable region of the media object into a customized media object having a modified customizable region. The processor can generate, based on a card template having a portion compatible with the media object, a card object corresponding to the card template and can include the customized media object. The processor can generate, based on the card object, an NFT that can include a first identifier of the customized media object and a second identifier of the card template. The processor can register, based on the NFT, the card object to a user account via a block at a blockchain. The processor can link the NFT with a wallet object corresponding to the user account.

BRIEF DESCRIPTION OF THE DRAWINGS

These and other aspects and features of the present implementations will become apparent to those ordinarily skilled in the art upon review of the following description of specific implementations in conjunction with the accompanying figures, wherein:

FIG. 8 depicts an example method of media customization, in accordance with present implementations.

DETAILED DESCRIPTION

Figure 1:
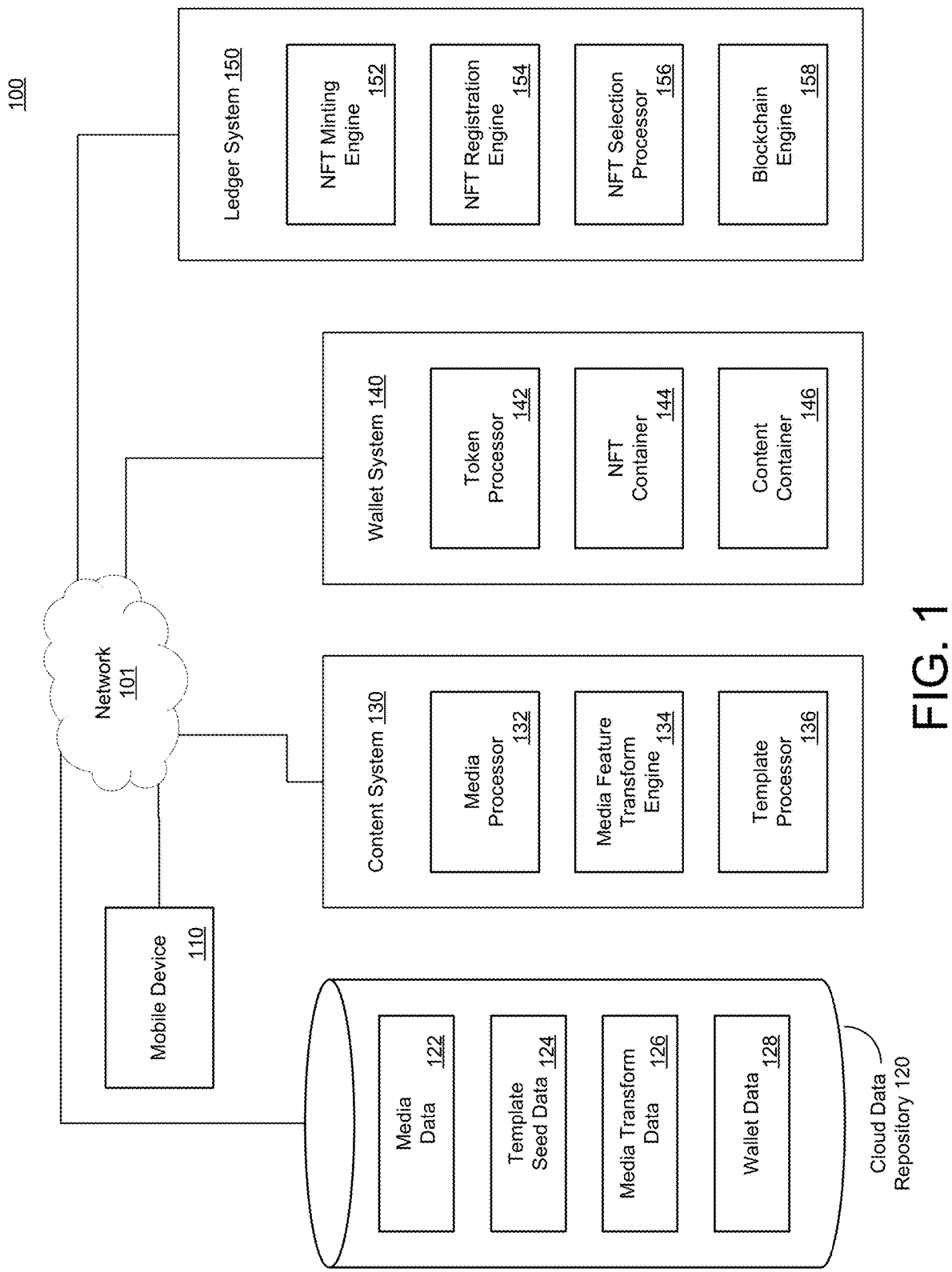
FIG. 1 depicts an example system, in accordance with present implementations.

The present implementations will now be described in detail with reference to the drawings, which are provided as illustrative examples of the implementations so as to enable those skilled in the art to practice the implementations and alternatives apparent to those skilled in the art. Notably, the figures and examples below are not meant to limit the scope of the present implementations to a single implementation, but other implementations are possible by way of interchange of some or all of the described or illustrated elements. Moreover, where certain elements of the present implementations can be partially or fully implemented using known components, only those portions of such known components that are necessary for an understanding of the present implementations will be described, and detailed descriptions of other portions of such known components will be omitted so as not to obscure the present implementations. Implementations described as being implemented in software should not be limited thereto, but can include implementations implemented in hardware, or combinations of software and hardware, and vice-versa, as will be apparent to those skilled in the art, unless otherwise specified herein. In the present specification, an implementation showing a singular component should not be considered limiting; rather, the present disclosure is intended to encompass other implementations including a plurality of the same component, and vice-versa, unless explicitly stated otherwise herein. Moreover, applicants do not intend for any term in the specification or claims to be ascribed an uncommon or special meaning unless explicitly set forth as such. Further, the present implementations encompass present and future known equivalents to the known components referred to herein by way of illustration.

This technical solution can include identification and customization of media content, and secure storage and transmission of customized media content via NFT systems. For example, this technical solution can identify media content having various characteristics, including but not limited to meme and viral characteristics, and obtain that media content for customization. For example, this technical solution can generate NFTs corresponding to medica content objects, where the NFTs can be transmissible to any NFT container compatible with storing NFTs. Thus, the technical solution can include a mixture of NFTs linked with media objects and NFTs linked with objects distinct from media, such as currency or cryptocurrency objects. Thus, the technical solution can expand wallet container compatibility and increase accessibility and adoption of NFT wallets by consumers. This technical solution can identify media content of interest to consumers, and can create customizable media content based on one or more features of the media content. This technical solution can identify one or more regions, outlines, or the like, of an image, and can create a customizable portion based on the identified region. For example, the technical solution can identify a portion of an image corresponding to a region filled with a particular color, and can modify pixels of that region to a different color. Thus, the technical solution can provide the technical improvement of detecting media content having particular characteristics at high scale, and generating a customizable version of that media content, at scale and granularity exceeding manual capability.

FIG. 1 depicts an example system, in accordance with present implementations. As illustrated by way of example in FIG. 1, an example system 100 can include at least a network 101, a mobile device 110, a cloud data repository 120, a content system 130, a wallet system 140, and a ledger system 150.

The network 101 can include any type or form of network. The geographical scope of the network 101 can vary widely and the network 101 can be a body area network (BAN), a personal area network (PAN), a local-area network (LAN), e.g., Intranet, a metropolitan area network (MAN), a wide area network (WAN), or the Internet. The topology of the network 101 can be of any form and can include, e.g., any of the following: point-to-point, bus, star, ring, mesh, or tree. The network 101 can be an overlay network which is virtual and sits on top of one or more layers of other networks 101. The network 101 can be of any such network topology as known to those ordinarily skilled in the art capable of supporting the operations described herein. The network 101 can utilize different techniques and layers or stacks of protocols, including, e.g., the Ethernet protocol, the internet protocol suite (TCP/IP), the ATM (Asynchronous Transfer Mode) technique, the SONET (Synchronous Optical Networking) protocol, or the SDH (Synchronous Digital Hierarchy) protocol. The TCP/IP internet protocol suite can include application layer, transport layer, internet layer (including, e.g., IPv6), or the link layer. The network 101 can include a type of a broadcast network, a telecommunications network, a data communication network, or a computer network. The mobile device 110 can include a smartphone, tablet, laptop computer, wearable device, or the like. The mobile device 104 can include one or more of a display device, a sound generating device, and a haptic feedback device. The mobile device 104 can include a user interface operable with any component of the mobile device 104 to generate any indications, presentations, or the like, discussed herein.

The cloud data repository 120 can store data associated with the system 100. The cloud data repository 120 can include one or more hardware memory devices to store binary data, digital data, or the like. The cloud data repository 120 can include one or more electrical components, electronic components, programmable electronic components, reprogrammable electronic components, integrated circuits, semiconductor devices, flip flops, arithmetic units, or the like. The cloud data repository 120 can include at least one of a non-volatile memory device, a solid-state memory device, a flash memory device, and a NAND memory device. The cloud data repository 120 can include one or more addressable memory regions disposed on one or more physical memory arrays. The cloud data repository 120 can include a media data storage 122, a template seed data storage 124, a media transform data storage 126, and a wallet data storage 128.

The media data storage 122 can store media content objects in one or more formats or having one or more types. For example, the media data storage 122 can store image data, video data, and/or audio data, in any format. The media data storage 122 can obtain and store media content from or via the network 101, and can include media content objects having intrinsic or extrinsic characteristics. For example, intrinsic characteristics can include attributes of the media content objects, including pixel values, shapes, resolutions, or any combination thereof. For example, extrinsic characteristics can include attributes linked with the media content objects, including number of likes, number of shares, weeks or months at a threshold of likes, shares, or any combination thereof. For example, the media content objects can include proprietary images of characters, logos, or video clips. For example, the media content can include content associated with "viral" or "meme" status in accordance with a pattern of propagation across the network 101. One or more media content objects can correspond to media content.

The template seed data storage 124 can include one or more templates corresponding to communication files. For example, communication files can include e-cards, media messages, e-vites, or any combination thereof. The templates can include one or more dynamic fields that indicate modifiable portions of the template and indicate values of the template that can be customized. A template can include at least one media content region into which a first media content can be embedded. For example, the template can correspond to an e-card or e-vite having one or more pages and one or more presentation fields within those pages. The template can define or include data regarding background, formatting, branding, or promotions, and can include user-customizable fields where user content can be added to particular e-card or e-vites. For example, a template can include a first portion embeddable with a media content object corresponding to a meme or proprietary content, and can include a second portion embeddable with a text, audio, or video message.

The media transform data storage 126 can store one or more aspects of one or more corresponding media content objects that can be modified by the mobile device 110 or an application executing at the mobile device 110 or the content system 130. For example, an aspect of a media content object can include a particular portion of the media content object, a particular range of pixel coordinates of the media content object, a particular range of pixel color or luminosity values of the media content object, or any combination thereof. For example, the media data storage 112 can store a circle shape, and the media transform data storage 126 can store an editable fill color and an editable outline color for the circle shape. Multiple aspect of a media content object can be customizable or editable. The aspects can be stored as pixels maps or vector definitions, for example. The wallet data storage 128 can store links between various user accounts for various users and various wallet objects corresponding to various users.

The content system 130 can retrieve and modify a media content object to generate a customized media content object. The content system 130 can modify a media content object based on one or more aspects of the media transform data corresponding to that media content object. The content system 130 can include at least a media processor 132, a media feature transform engine 134, and a template processor 136. The content processor 130 can be at least partially located outside of the ledger system 150 or a particular component thereof, and can thus be located at least partially "off-chain" as distinct from a blockchain structure.

The media processor 132 can obtain media content objects from the media data storage 122, and can obtain or generate media content objects via the network 101. For example, the media processor 132 can retrieve one or more media content objects from the media data storage 112, and can obtain the media content object based on a criterion corresponding to a user or a template. For example, the media processor 132 can obtain at least one content object from the media data storage 112 having a relationship metric that is linked with a particular template or particular brand identifier. The media processor 132 can sort or filter media content objects from the media data storage 112 based on one or more relationship metrics. For example, the media processor 132 can obtain all media objects corresponding to a "Space Adventure" brand. For example, the media processor 132 can obtain all media objects having a resolution compatible with scaling to a particular template field.

The media processor 132 can obtain content via the network 101 and can generate a media content object based on identification of particular media transmitted via the network. For example, the media processor 132 can include a machine learning engine to obtain as input one or more metrics variously indicating frequency of transmission of a particular media object, number of destinations of transmission of a particular media object, or timestamps of transmission of a particular media object. The machine learning engine can be trained with input including propagation timestamps, addresses, and the like, of particular media content objects. The media processor 132 can generate by the machine learning engine a virality metric indicating a level of transmission of the particular media object. The media processor 132 can add the particular media object to the media data storage 112 in response to a determination that the virality metric satisfies a virality threshold indicating a minimum level of popularity of the media content object.

The media feature transform engine 134 can transform media content objects from the media data storage 122, based on aspects of the media transform data storage 126. For example, the media feature transform engine 134 can retrieve one or more media content objects from the media data storage 112, and can transform the media content object based on a criterion corresponding to a media feature transform definition. The media feature transform engine 134 can transform or generate a media content object in response to receiving a selection of one or more media feature transforms via input at the mobile device 110.

The media feature transform engine 134 can modify or generate one or more portions or aspects of a media content object. For example, the media feature transform engine 134 can include a second machine learning engine to obtain as input one or more metrics variously indicating frequency of transmission of a particular media object, number of destinations of transmission of a particular media object, or timestamps of transmission of a particular media object. The machine learning engine can be trained with input including pixel data, vector data, text data, and pixel patterns or images, for example. The media feature transform engine 134 can generate by the machine learning engine one or more customizable regions based on identifying one or more editable regions. For example, the media feature transform engine 134 can identify one or more shapes whose outlines or fills can be modified. For example, the media feature transform engine 134 can identify one or more regions including text that can be removed or supplemented with customized text.

The template processor 136 can obtain and modify one or more templates. The template processor 136 can generate a particular instance of a template and embed one or more media content objects into the particular instance of the template. The template processor 136 can generate a particular instance of a template and embed one or more message objects into the particular instance of the template.

The wallet system 140 can receive, output, and store secure content corresponding to one or more wallet objects of one or more particular users. The wallet system 140 can include a token processor 142, a NFT container 144, and a content container 146. The token processor 142 can authenticate a particular user to a particular wallet object based on an authentication key or identification NFT of the user. For example, the mobile device 110 can transmit a public key or an identification NFT to the wallet system via the network 101. The token processor 142 can receive the public key or the identification NFT and authenticate the mobile device 110 to receive output from a particular portion of the NFT container or the content container corresponding to the public key or the identification NFT.

The NFT container 144 can include a secure data region or a plurality of secure data regions that are encrypted or encryptable. The NFT container 144 can restrict output of any NFTs stored therein to a destination authorized by the token processor 142 or the user account that controls the wallet. The NFT container 144 can store NFTs corresponding to e-cards, e-vites, or any combination thereof, linked with a particular wallet account of a particular user. The NFTs can be mirrored from a blockchain or can be references to NFTs stored as various blocks of a blockchain. The content container 146 can include a secure data region or a plurality of secure data regions that are encrypted or encryptable. The content container 146 can restrict output of any media content objects stored therein to a destination authorized by the token processor 142 or the user account that controls the wallet. The content container 146 can store media content objects corresponding to e-cards, e-vites, or any combination thereof, linked with a particular wallet account of a particular user. The media content objects can be mirrored from a blockchain or can be references to NFTs stored as various blocks of a blockchain.

The ledger system 150 can control minting of NFTs and registration of NFTs to a blockchain. The ledger system 150 can include a NFT minting engine 152, a NFT registration engine 154, a NFT selection processor 156, and a blockchain engine 158. The NFT minting engine 152 can generate NFTs having a particular structure or having one or more particular properties. For example, the NFT minting engine 152 can generate metrics based on intrinsic or extrinsic aspects of a particular media content object, any metrics corresponding to a machine learning model associated with the system 100, or any aspects of the ledger system 150 or any component thereof at the time of minting. The NFT registration engine 154 can generate a block at a blockchain corresponding to an NFT. The NFT registration engine 154 can obtain an NFT by the NFT minting engine 152 or via the network, or any combination thereof. The NFT minting engine 152 can post the NFT, or a reference to the NFT, to a particular location of the blockchain or a particular end of a blockchain.

The NFT selection processor 156 can select a particular NFT registered with the ledger system 150. The NFT selection processor 156 can select an NFT based on a probability of selection. The probability of selection can be based on a particular media content object or a particular template. For example, the NFT selection processor 156 can select a first NFT for a first e-card having a first media content object at a first probability, and can select a second NFT for a second e-card having a second media content object at a second probability. The NFT selection processor 156 can generate one or more probabilities corresponding to one or more media content objects, templates, features, or values thereof. For example, the NFT selection processor 156 can generate a probability of selection for all NFTs that correspond to a "Space Adventure" brand. In response to selecting an NFT, the NFT selection processor 156 can transmit an instruction to the NFT minting engine 152 to generate a reward NFT for a particular user account linked with the selected NFT, and to transmit the reward NFT to the wallet of the particular user account. In response to selecting an NFT, the NFT selection processor 156 can transmit an instruction to the NFT registration engine 154 to register the reward NFT to a blockchain. The reward NFT can be registered to a reward blockchain distinct from the blockchain on which NFT corresponding to customized templates is stored, or can be registered to that same blockchain. The blockchain engine 158 can maintain and update a blockchain. The blockchain engine 158 can store one or more blockchains, including a media content blockchain, a customized content blockchain, and a reward blockchain.

For example, the system can select, based on a probability of selection corresponding to the media object or the template, the NFT. The system can generate, in response to the selecting the NFT and based on the NFT, a second NFT. For example, the system can generate, based on the second NFT, a second block at the blockchain, the block to register the second NFT to the user account. The system can link the second NFT to the wallet of the user account. For example, the system can generate, based on one or more of the media object, the customizable region, and the card template, a probability metric indicating the probability of selection. For example, the system can generate, by a machine learning model trained with input can include one or more of media data, the customizable region. For example, the system can include the customizable region corresponding to a shape having one or more of a modifiable outline or a modifiable fill. For example, the system can modify, based on a media feature transform definition, the customizable region. For example, the NFT can include a feature transform metric having the media feature transform definition.

For example, the system can receive, at a user interface, input to modify a property of a media object. The system can modify, in response to receiving the input at the user interface, the customizable region of the media object based on the property into the customized media object having the modified customizable region. For example, the system can cause, in response to the modifying the customizable region of the media object based on the property, the user interface to present the card object, which can include the customized media object having the modified customizable region.

For example, a computer readable medium can include one or more instructions executable by a processor to receive, from a user interface, input to modify a property of a media object. The processor can modify, in response to receiving the input at the user interface, the customizable region of the media object based on the property into the customized media object having the modified customizable region. The processor can cause, in response to the modifying the customizable region of the media object based on the property, the user interface to present the card object, which can include the customized media object having the modified customizable region.

Figure 2:
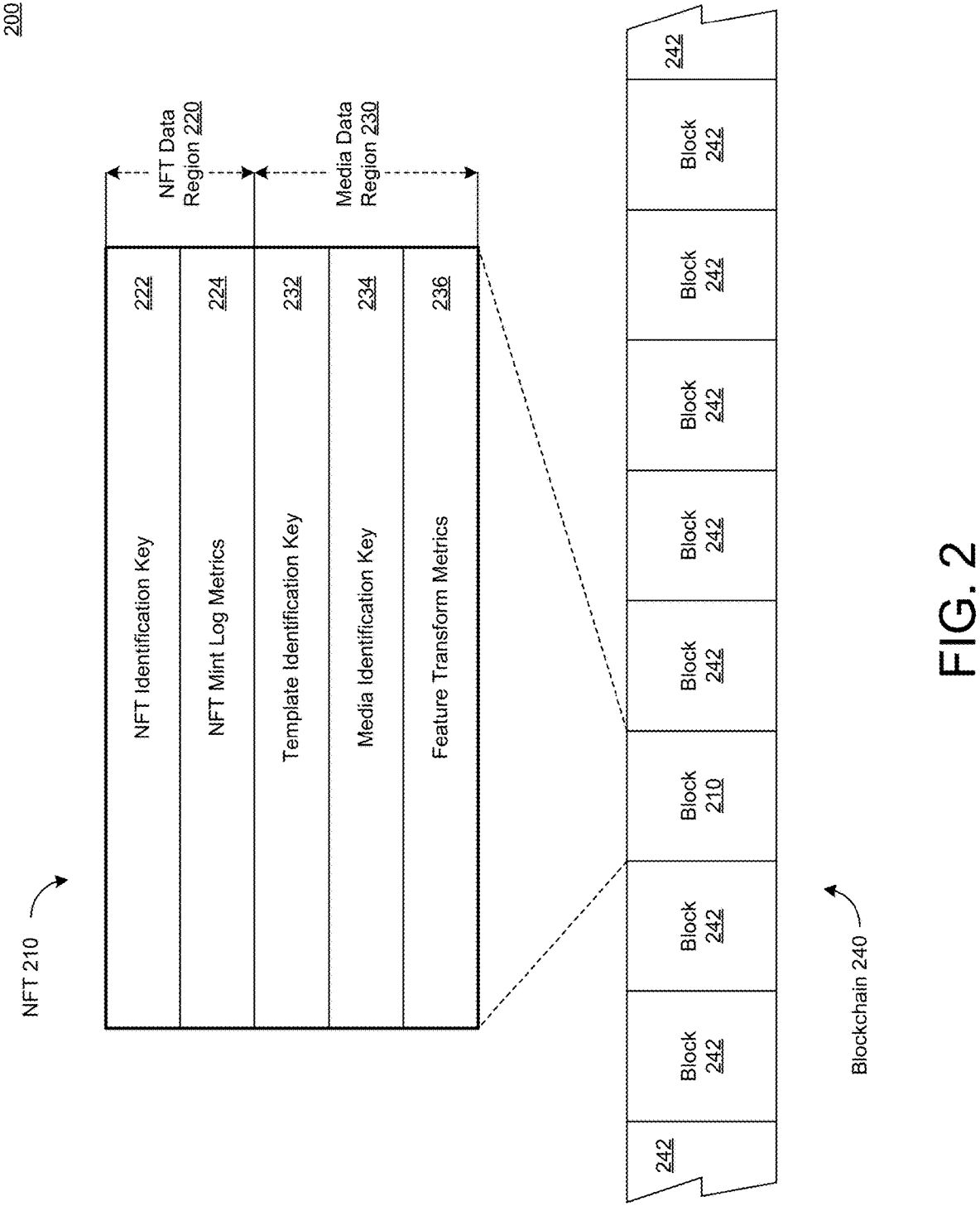
FIG. 2 depicts an example NFT data structure, in accordance with present implementations.

FIG. 2 depicts an example NFT data structure, in accordance with present implementations. As illustrated by way of example in FIG. 2, an example NFT data structure 200 can include at least a NFT 210, and a blockchain 240. The NFT 210 can include a particular data structure that identifies particular media content and authorized control of the particular media content. The NFT 210 can include one or more of an NFT data region 220, and a media data region 230.

The NFT data region 220 can identify the NFT 210 and provide provenance metrics of the NFT 210. The NFT data region 220 can be provided as input to validate the generation of the NFT 210. The NFT data region 220 can include a NFT identification key 222, and NFT mint log metrics 224. The NFT identification key 222 can store a particular identification string or address corresponding to the NFT 210. The NFT mint log metrics 224 can store particular metrics corresponding to the minting of the NFT 210. The NFT mint log metrics 224 can include time of minting virtual or physical components performing the minting, input provided to the minting, or any combination thereof.

The media data region 230 can identify media content and components associated therewith that are linked with the NFT 210. The media data region 230 can provide provenance metrics of the media content and components associated therewith that are linked with the NFT 210. The media data region 230 can include a template identification key 232, a media identification key 234, and feature transform metrics 236. The template identification key 232 can identify a particular template used to create customized content linked with the NFT. The media identification key 234 can identify a particular media content object used to create customized content linked with the NFT. The feature transform metrics 236 can identify a particular media feature transform definition used to create customized content linked with the NFT. The blockchain 240 can store one or more blocks in an immutable ledger structure. The blockchain engine 158 can maintain the blockchain 240. The blockchain 240 can be permissioned or permissionless. The blockchain 240 can include blocks 242. The blocks 242 can identify particular NFTs or authorized controller of particular NFTs.

In another embodiment, the media data region 230 of the NFT 210 can alternatively include a metadata identification key (in lieu of the template identification key 232, media identification key 234, and/or feature transform metrics 236). The metadata identification key may be an indication of (e.g., an address, a pointer to) an off-chain location where feature transform metrics, template key, media key, and/or other metadata are stored. Stated otherwise, the payload of the data is simply an indicator of the off-chain location where the feature transforms, template key, and/or media data key can be accessed. The off-chain storage of the transform metrics, template key, media key, and/or other metadata can reduce storage requirements and/or overhead requirements of the blockchain 240. As can be appreciated, other arrangements and configurations of data storage (and location(s) thereof) may be implemented.

Figure 3:
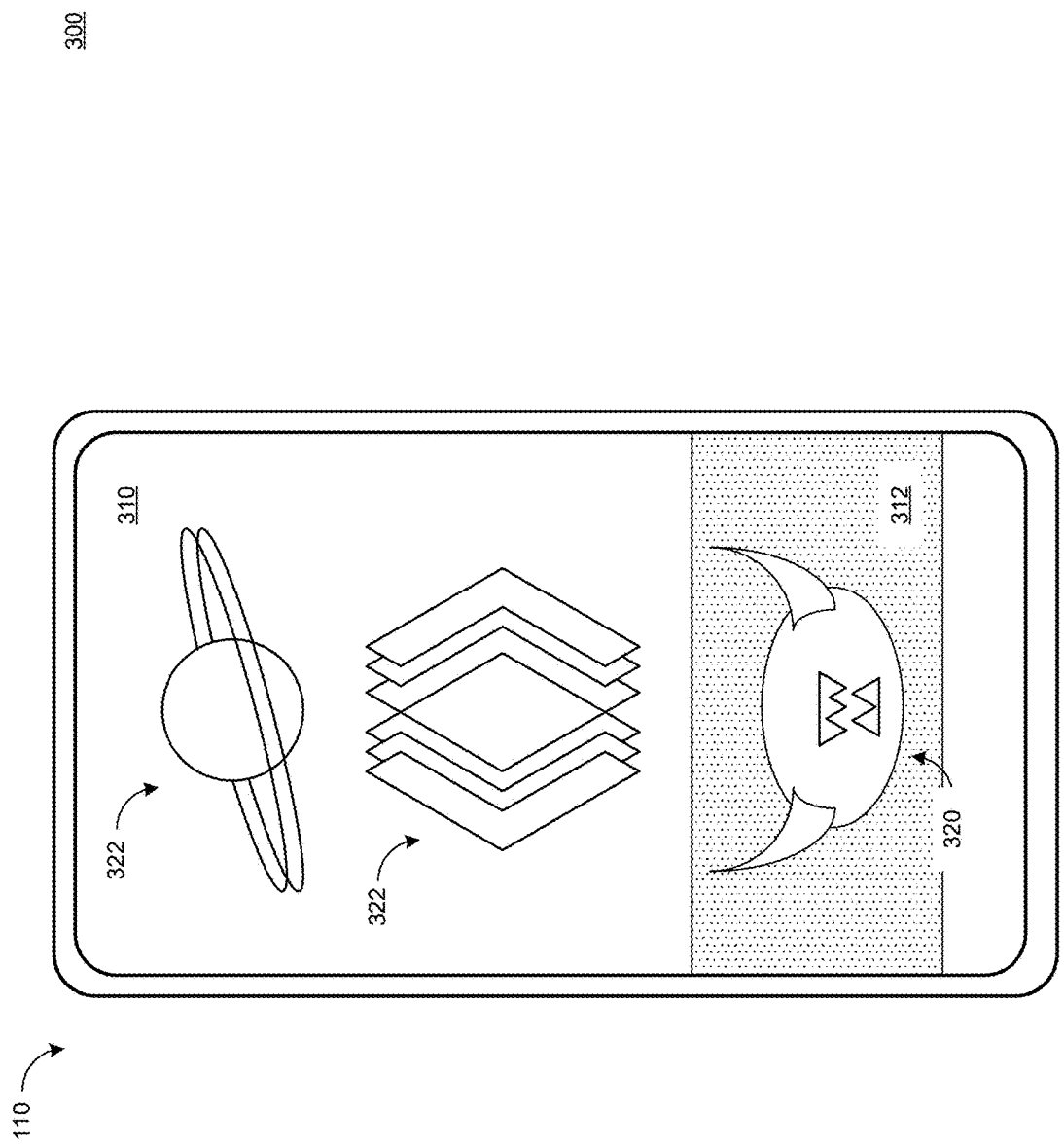
FIG. 3 depicts an example user interface, in accordance with present implementations.

FIG. 3 depicts an example user interface, in accordance with present implementations. As illustrated by way of example in FIG. 3, an example user interface 300 can include at least a content selection presentation 310, a content selection indication 312, a selected media content 320, and media content objects 322. The mobile device 110 can generate the user interface 300 and one or more portions thereof by one or more of a display device, operating system, and audio generating device thereof.

The content selection presentation 310 can present one or more media content objects obtained from the media data storage 122. The content selection presentation 310 can include one or more selectable regions each corresponding one of the media content objects to receive input to select the corresponding media content object. The content selection indication 312 can provide an indication of selection of a particular media content object. For example, the content selection indication 312 can present a highlighted background or pattern corresponding to or located proximate to the selected media content object 320. The selected media content object 320 can correspond to a particular media content object selected by a user of the mobile device 110 via the user interface 300. For example, the user can select the selected media content object 320 by activating a touch sensor at a portion of the display of the mobile device 110 that corresponds to the selected media content object 320. The media content objects 322 can correspond to a particular media content objects distinct from the selected media content object 320.

Figure 4:
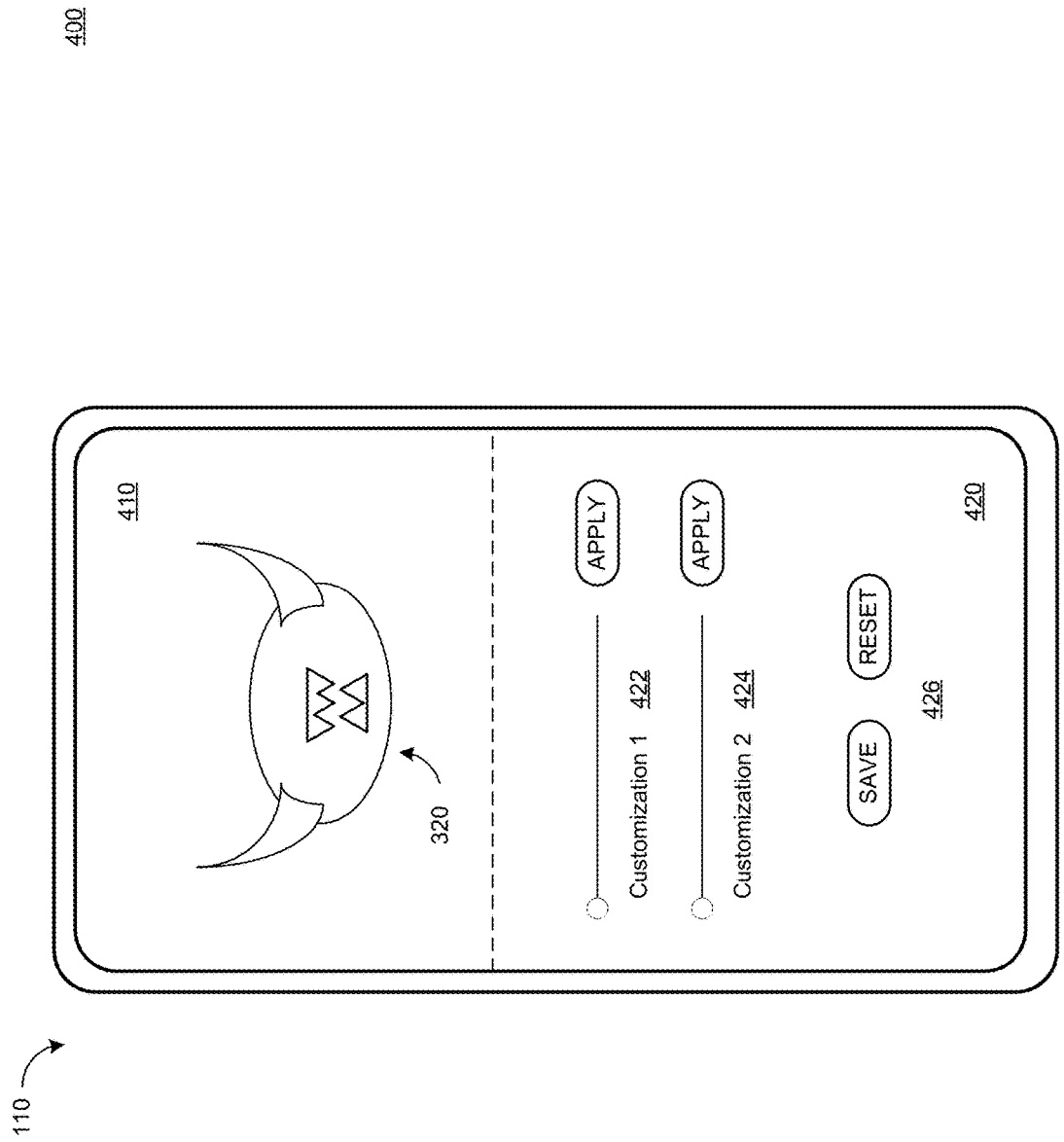
FIG. 4 depicts an example user interface, in accordance with present implementations.

FIG. 4 depicts an example user interface, in accordance with present implementations. As illustrated by way of example in FIG. 4, an example user interface 400 can include at least a selected media content object 320, a media transform presentation 410, and a transform input presentation 420. The mobile device 110 can generate the user interface 400 and one or more portions thereof by one or more of a display device, operating system, and audio generating device thereof. The media transform presentation 410 can present the selected media content object 320 and can present any modifications or customizations to the selected media content object 320.

The transform input presentation 420 can present one or more control affordances and input affordances to modify one or more features or portions of the selected media content object 320. For example, particular affordances of the transform input presentation 420 can be linked with particular portions or aspects of the selected media content object 320 to modify those particular portions or aspects of the selected media content object 320. For example, a portion of a media content object can correspond to a particular range or shape of pixels. For example, an aspect of a media content object can correspond to any pixels of the media content object having a particular transparency, color or luminosity value. The transform input presentation 420 can include a first customization input affordance 422, a second customization input affordance 424, and a media transform control affordance 426.

The first customization input affordance 422 can modify a first portion or aspect of the selected media content object 320. For example, the first customization input affordance 422 can correspond to a slider bar that can modify a fill color of a predetermined portion of the selected media content object 320 in accordance with a feature obtained from the media transform data storage 126 corresponding to the selected media content object 320. For example, the first customization input affordance 422 can be linked to a first particular shape, a first particular line of the shape, or a first particular fill color of the shape. The second customization input affordance 424 can modify a second portion or aspect of the selected media content object 320. For example, the second customization input affordance 422 can correspond to a slider bar that can modify a fill color of a second predetermined portion of the selected media content object 320 in accordance with a second feature obtained from the media transform data storage 126 corresponding to the selected media content object 320. For example, the second customization input affordance 424 can be linked to a second particular shape, a second particular line of a shape, or a second particular fill color of a shape, distinct from the first particular shape, the first particular line of the shape, or the first particular fill color of the shape. The media transform control affordance 426 can receive an indication to generate an updated or modified version of the selected media content object 320, or receive an indication to generate new media content object based on the selected media content object 320.

Figure 5:
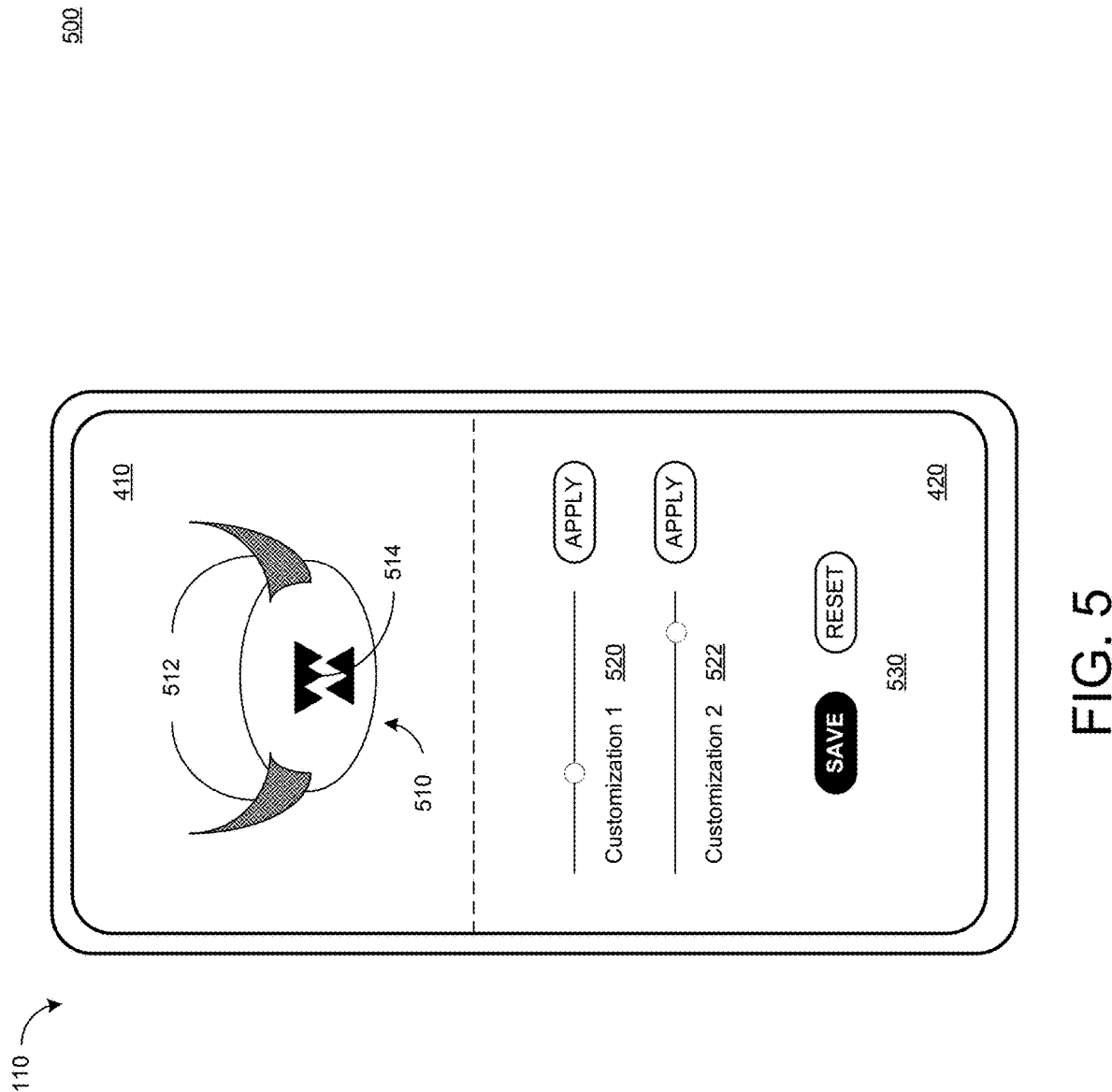
FIG. 5 depicts an example user interface, in accordance with present implementations.

FIG. 5 depicts an example user interface, in accordance with present implementations. As illustrated by way of example in FIG. 5, an example user interface 500 can include at least a transformed media content object 510, a first activated customization input affordance 520, a second activated customization input affordance 522, and an activated media transform control affordance 530. The mobile device 110 can generate the user interface 500 and one or more portions thereof by one or more of a display device, operating system, and audio generating device thereof.

The transformed media content object 510 can correspond to the selected media content object 320 having one or more modifications. The transformed media content object 510 can include a first transformed media feature 512, and a second transformed media feature 514. The first transformed media feature 512 can correspond to a first portion of the transformed media content object 510 that has been modified in accordance with actuation of the first activated customization input affordance 520. For example, the first transformed media feature 512 can have a fill color corresponding to a fill color indicated by the first activated customization input affordance 520. The second transformed media feature 514 can correspond to a second portion of the transformed media content object 510 that has been modified in accordance with actuation of the second activated customization input affordance 520. For example, the second transformed media feature 514 can have a fill color corresponding to a fill color indicated by the second activated customization input affordance 522.

The first activated customization input affordance 520 can receive user input via the mobile device and the user interface 500 to cause a particular modification or customization of the first transformed media feature 512. For example, the first activated customization input affordance 520 can include a slider bar having positions that indicate different colors of a spectrum. The first transformed media feature 512 can change a fill color in real-time in response to movement of a slider button of the first activated customization input affordance 520 along a slider bar of the first activated customization input affordance 520. The second activated customization input affordance 522 can receive user input via the mobile device and the user interface 500 to cause a particular modification or customization of the second transformed media feature 514. For example, the second activated customization input affordance 522 can include a slider bar having positions that indicate different colors of a spectrum. The second transformed media feature 514 can change a fill color in real-time in response to movement of a slider button of the second activated customization input affordance 522 along a slider bar of the second activated customization input affordance 522. The activated media transform control affordance 530 can receive an indication to modify the selected media content object 320 into the transformed media content object 510, or receive an indication to generate the transformed media content object 510 based on the selected media content object 320.

Figure 6:
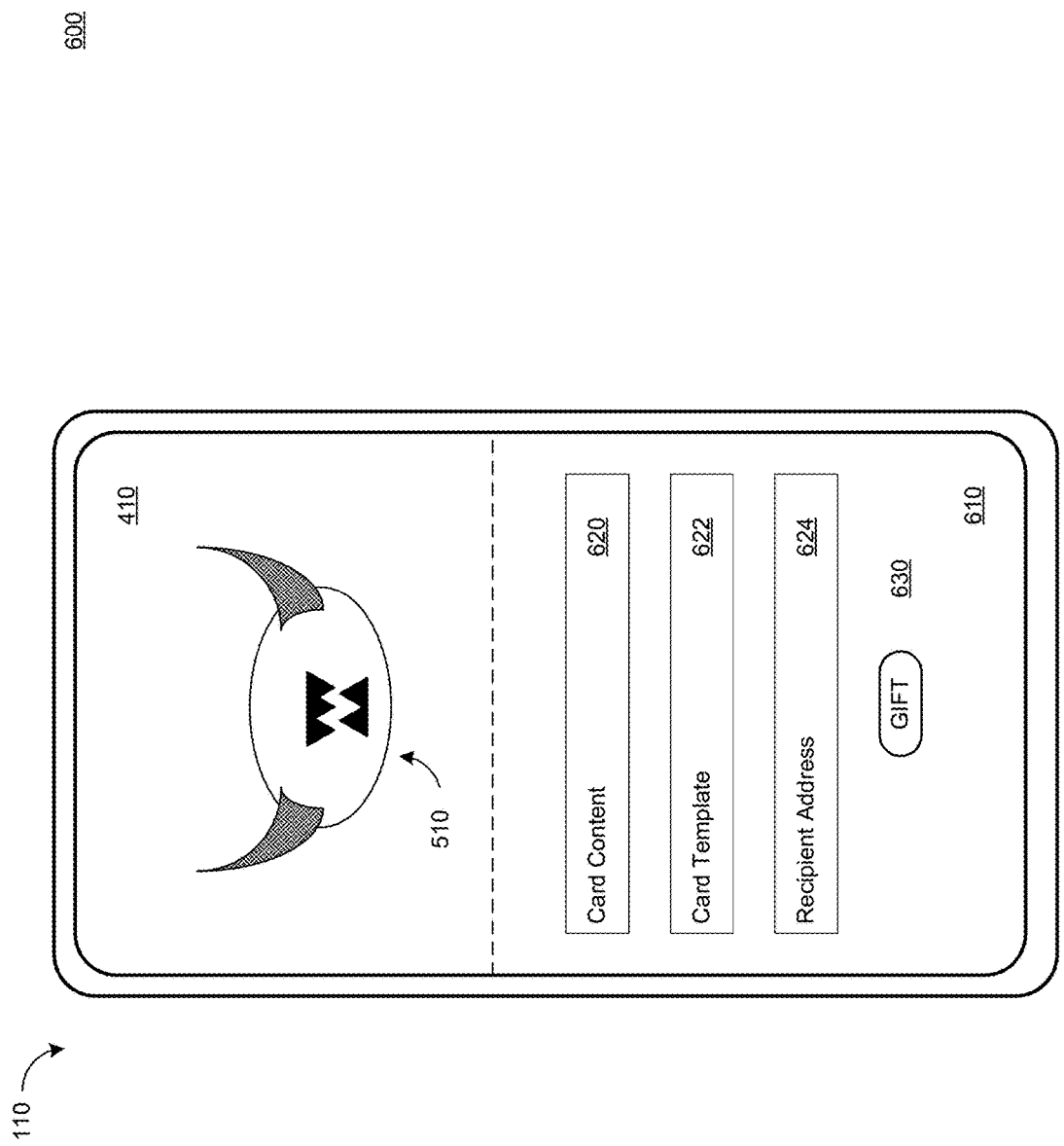
FIG. 6 depicts an example user interface, in accordance with present implementations.

FIG. 6 depicts an example user interface, in accordance with present implementations. As illustrated by way of example in FIG. 6, an example user interface 600 can include at least the media transform presentation 410 and a customization input presentation 610. The mobile device 110 can generate the user interface 600 and one or more portions thereof by one or more of a display device, operating system, and audio generating device thereof.

The customization input presentation 610 can present one or more control affordances and input affordances to modify one or more features or portions of a template. For example, particular affordances of the customization input presentation 610 can be linked with particular portions or aspects of a particular card template to modify those particular portions or aspects of the card template. For example, a portion of a card template can correspond to a region of the template compatible with embedding a media content object. The customization input presentation 610 can include a card content input affordance 620, a card template selection affordance 622, a recipient address input affordance 624, and a transmission control affordance 630. The card content input affordance 620 can modify a first portion or aspect of the template. For example, the card content input affordance 620 can correspond to a text input field that can receive text corresponding to a title, message, recipient, or sender field of the card template. The customization input presentation 610 can include multiple card content input affordances 620 variously associated with various distinct fields.

The card template selection affordance 622 can receive a selection of a particular template. For example, the card template selection affordance 622 can correspond to a drop-down menu that can receive a selection of one of a plurality of available templates. The recipient address input affordance 624 can receive an identifier corresponding to a recipient device, account, or wallet. For example, the recipient address input affordance 624 can correspond to a text input field that can receive text corresponding to an email address, device address, user ID, or wallet ID for a particular user.

The transmission control affordance 630 can receive an input to send a card object in accordance with the customization of the media content object and the template. The transmission control affordance 630 can send the card object or one or more metrics or objects to regenerate the card object. The transmission control affordance 630 can send the card object to the wallet system 140 to store the card object or portions thereof variously at the NFT container 144, the content container 146, and the wallet data storage 128. The transmission control affordance 630 can send the card object to the ledger system 150 to store an NFT corresponding to the card object at a blockchain of the blockchain engine 158. The transmission control affordance 630 can send a recipe object to the media transform data storage 126. The recipe object can include one or more instructions or metrics to duplication of the modifications or customization made to the selected media content object 320 to generate the transformed media content object 510.

Figure 7:
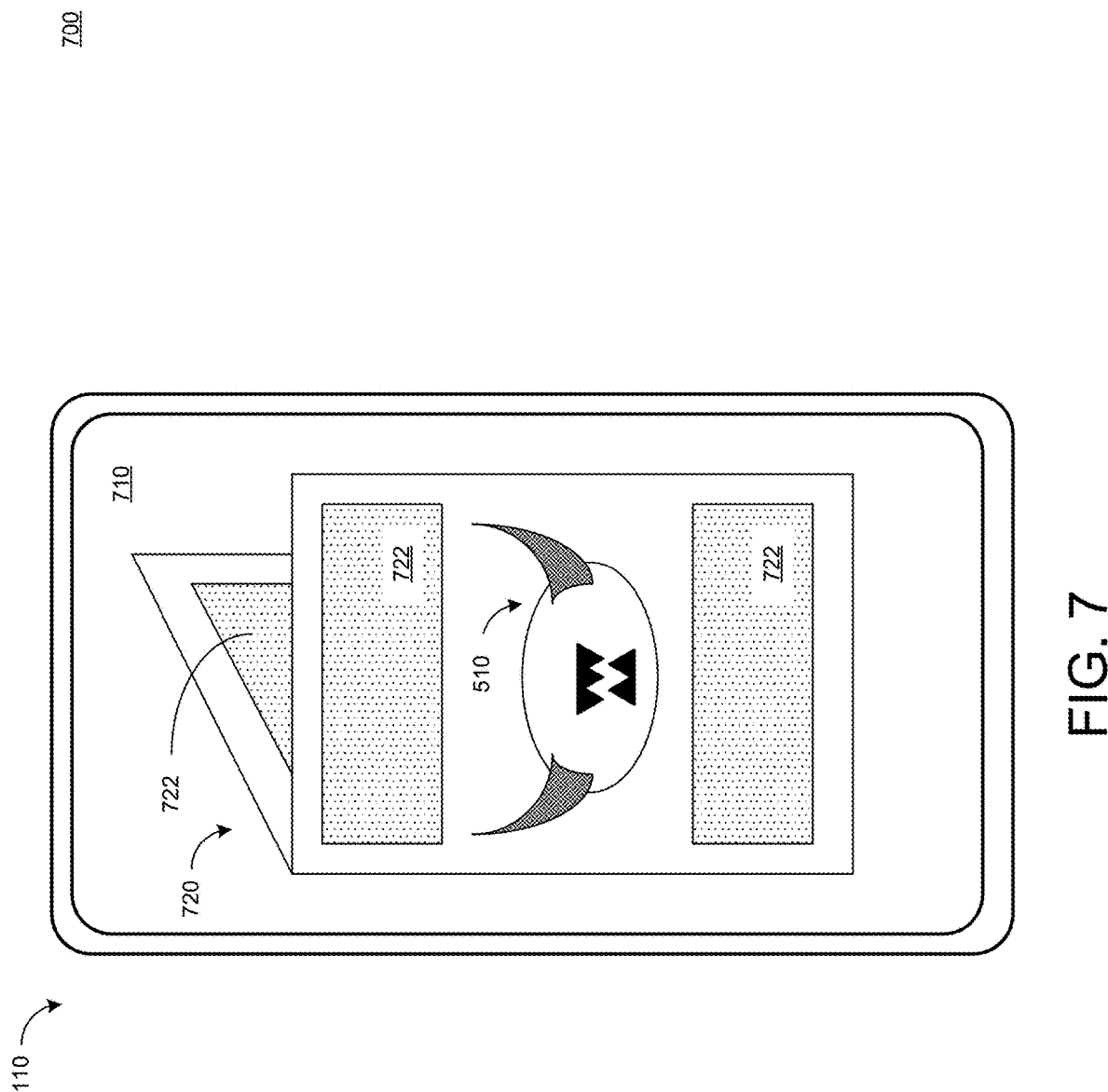
FIG. 7 depicts an example user interface, in accordance with present implementations.

FIG. 7 depicts an example user interface, in accordance with present implementations. As illustrated by way of example in FIG. 7, an example user interface 700 can include at least a recipient presentation 710, and a card presentation 720. The mobile device 110 can generate the user interface 700 and one or more portions thereof by one or more of a display device, operating system, and audio generating device thereof.

The recipient presentation 710 can present a card object having the transformed media content object 510 and further template customizations. The recipient presentation 710 can present a representation of a physical card or invitation as the card presentation 720. The card presentation 720 can include a card object having one or more pages or sheets with various customization thereof. The card presentation 720 can include a transformed media content 510, and custom card content fields 722. The custom card content fields 722 can include text content, image content, video content, audio content, or any combination thereof. The custom card content fields 722 can present content designated through input by or entered as input via the card content input affordance 620.

FIG. 8 depicts an example method 800 of media customization, in accordance with present implementations. At least system 100 can perform method 800. For example, one or more of the mobile device 110, the content system 130, the wallet system 140 and the ledger system 150 can perform method 800.

At 810, the method 800 can modify a customizable region of a media object into a customized media object. For example, the customizable region can correspond to a shape having one or more of a modifiable outline or a modifiable fill. At 812, the method 800 can modify a customizable region of a media object into a customized media object having a modified customizable region. For example, the method 800 can modify a portion of the media content object 320 into the first transformed media feature 512 and the second transformed media feature 514. At 820, the method 800 can generate a card object including the customized media object. For example, the card object can be rendered as the card presentation 720. At 822, the method 800 can generate a card object including the customized media object, based on a card template having a portion compatible with the media object. At 824, the method 800 can generate a customized media object embedded in the card object at a location for the portion of the card template. At 826, the method 800 can generate a card object corresponding to the card template.

At 830, the method 800 can generate an NFT based on the card object. At 832, the method 800 can generate an NFT including a first identifier of the customized media object. For example, the first identifier can link the customized media object with a particular wallet to allow a user interface linked with the wallet to present the customized media object for selection in the content selection presentation 310. At 834, the method 800 can generate an NFT including a second identifier of the card template. For example, user interface 700 can generate the recipient presentation 710 in response to a selection of the second identifier at the mobile device 110 corresponding to the recipient presentation 710.

Figure 9:
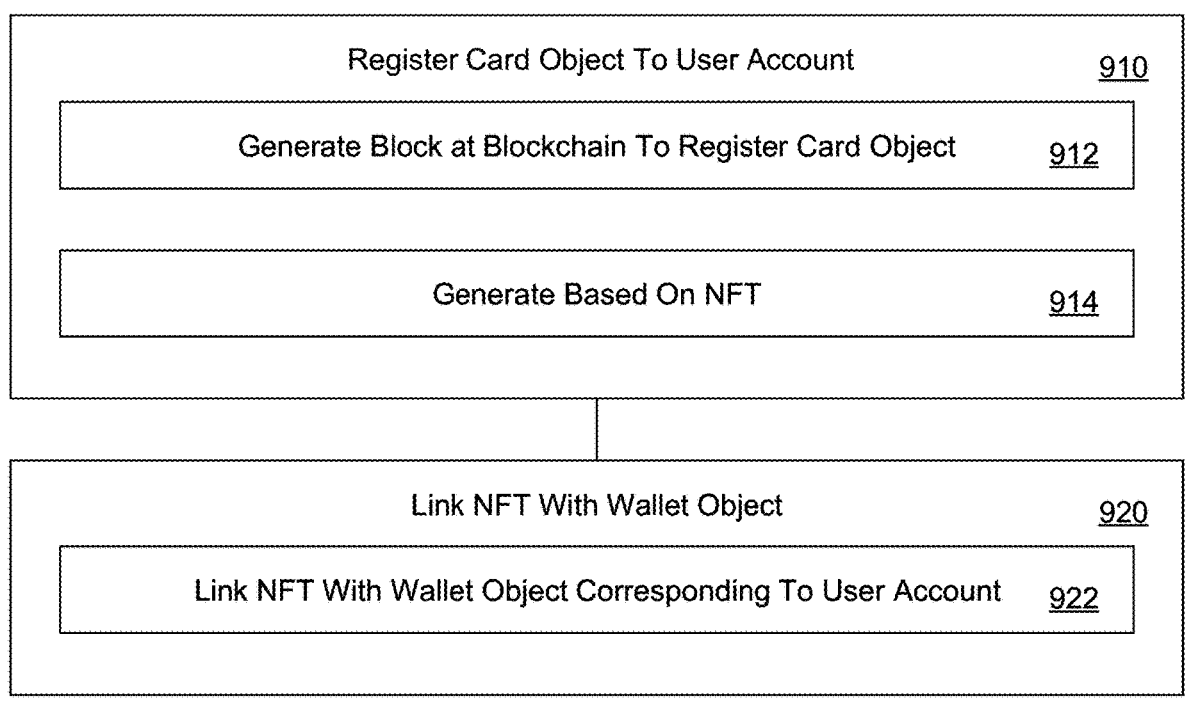
FIG. 9 depicts an example method of linking customized media content with an NFT, in accordance with present implementations.

FIG. 9 depicts an example method 900 of linking customized media content with an NFT, in accordance with present implementations. At least system 100 can perform method 900. For example, one or more of the mobile device 110, the content system 130, the wallet system 140 and the ledger system 150 can perform method 900. At 910, the method 900 can register a card object to a user account. At 912, the method 900 can generate, cause a blockchain to generate, or otherwise contribute to a block of a blockchain to register the card object to a user account. At 914, the method 900 can generate or cause a blockchain to generate the block to register the card object to a user account, based on the NFT. At 920, the method 900 can link the NFT with a wallet object. At 922, the method 900 can link the NFT with a wallet object corresponding to the user account.

Figure 10:
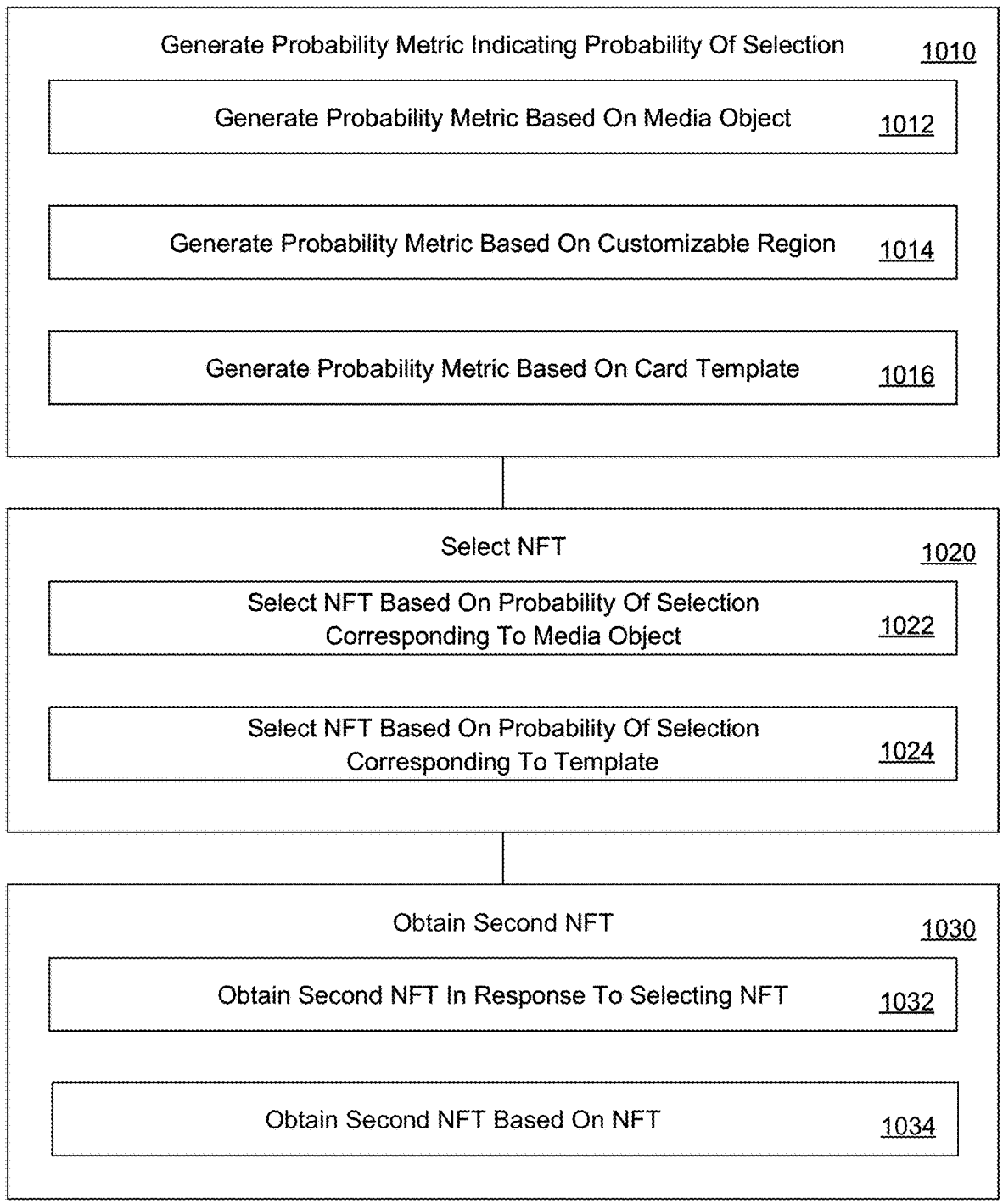
FIG. 10 depicts an example method of distributing an NFT based on selection of media content, in accordance with present implementations.

FIG. 10 depicts an example method 1000 of distributing an NFT based on selection of media content, in accordance with present implementations. At least system 100 can perform method 1000. For example, one or more of the mobile device 110, the content system 130, the wallet system 140 and the ledger system 150 can perform method 1000. The method 1000 can correspond to minting, transfer, or allocation of one or more NFTs to a particular wallet in response to user input received at a user interface corresponding to a particular user wallet. For example, the method 1000 can correspond to, but is not limited to, allocating an NFT corresponding to an asset of a media object or a currency to a particular wallet, in response to selection of another media object. Thus, the technical solution can provide a technical improvement of detecting user interaction with media content objects and providing linking of multiple types of assets to a user account via a single NFT wallet architecture.

At 1010, the method 1000 can generate a probability metric indicating the probability of selection. For example, a probability metric can correspond to a percentage value indicating a probability of selection by the NFT selection processor 156. For example, the probability metric can quantify the likelihood that the NFT selection processor 156 will select a particular NFT in accordance with a particular process for distributing content or assets to one or more NFT containers 144 or wallets at 128. For example, the method 1000 can include generating, based on one or more of the media object, the customizable region, and the card template, a probability metric indicating the probability of selection. At 1012, the method 1000 can generate a probability metric based on the media object. For example, the NFT selection processor 156 can determine a probability metric based on an absolute or relative number of instances of a particular media object. At 1014, the method 1000 can generate a probability metric based on the customizable region. For example, the NFT selection processor 156 can determine a probability metric based on an absolute or relative number of media objects having a customized region or a customized region satisfying particular customization criterion. For example, a customization criterion can correspond to particular colors, patterns, text, or any combination thereof. At 1016, the method 1000 can generate a probability metric based on the card template. For example, the NFT selection processor 156 can determine a probability metric based on a number of instances of a particular card template or type of card template.

At 1020, the method 1000 can select the NFT. For example, the method 1000 can include selecting, based on a probability of selection corresponding to the media object or the template, the NFT. At 1022, the method 1000 can select the NFT based on a probability of selection corresponding to the media object. At 1024, the method 1000 can select the NFT based on a probability of selection corresponding to the template.

At 1030, the method 1000 can generate a second NFT or cause a blockchain to generate a second NFT. For example, the second NFT can be linked with a media content object or an asset. For example, the media content object can correspond to an indication of selection, and can be linked with one or more of the selected NFT, and the NFT container corresponding to the selected NFT. For example, the asset can correspond to currency, cryptocurrency, a token, a wallet key to an NFT container distinct from an NFT container of the NFT, or any combination thereof. The method can include obtaining or generating, in response to the selecting the NFT and based on the NFT, a second NFT. At 1032, the method 1000 can obtain or generate a second NFT in response to the selecting the NFT. At 1034, the method 1000 can obtain or generate a second NFT based on the NFT. For example, the NFT minting engine 152 can generate the second NFT including by embedding, in the second NFT, one or more characteristics of the NFT as one or more NFT mint log metrics 224. For example, at least the wallet system 140 can obtain the second NFT generated by the NFT minting engine 152. For example, at least the wallet system 140 can obtain the second NFT via the ledger system 150.

Figure 11:
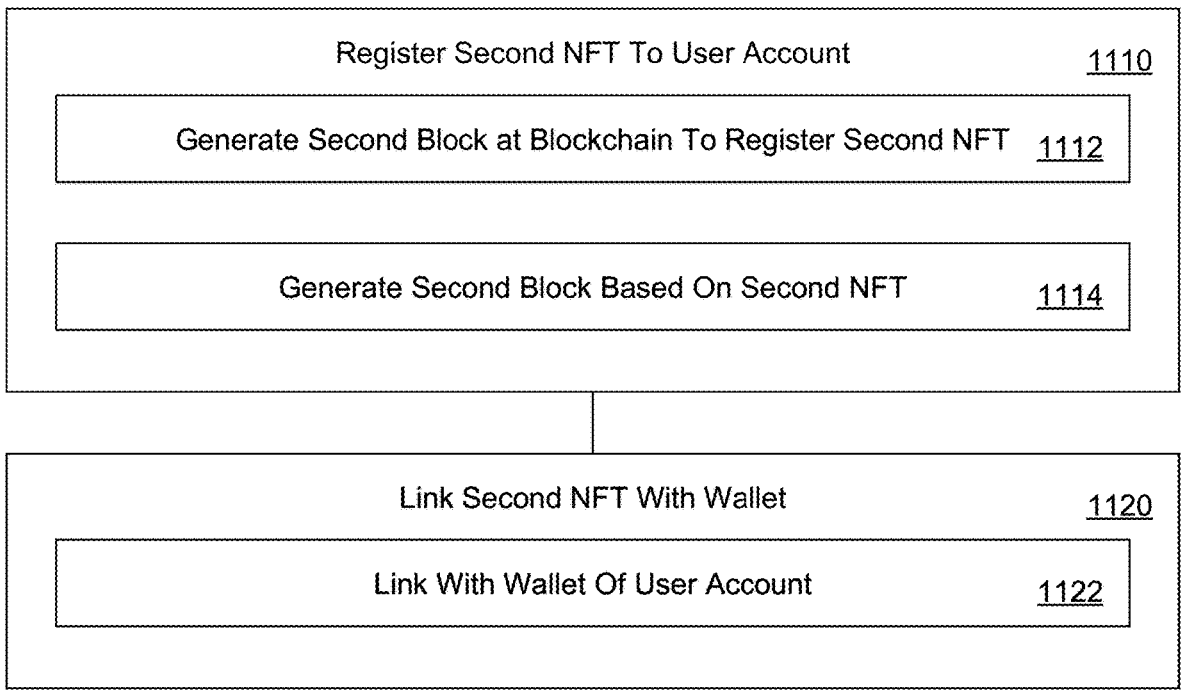
FIG. 11 depicts an example method of linking an NFT based on selection of media content, in accordance with present implementations.

FIG. 11 depicts an example method of linking an NFT based on selection of media content, in accordance with present implementations. At least system 100 can perform method 1100. At 1110, the method 1100 can register a second NFT to a user account. At 1112, the method 1100 can generate a second block or cause a blockchain to generate a second block at the blockchain to register the second NFT to the user account. At 1114, the method 1100 can cause a blockchain to generate a second block based on the second NFT. For example, the method can include generating, based on the second NFT, a second block at the blockchain, the block to register the second NFT to the user account. The method can include linking the second NFT to the wallet of the user account. At 1120, the method 1100 can link the second NFT with the wallet. At 1122, the method 1100 can link the second NFT with the wallet of the user account.

Figure 12:
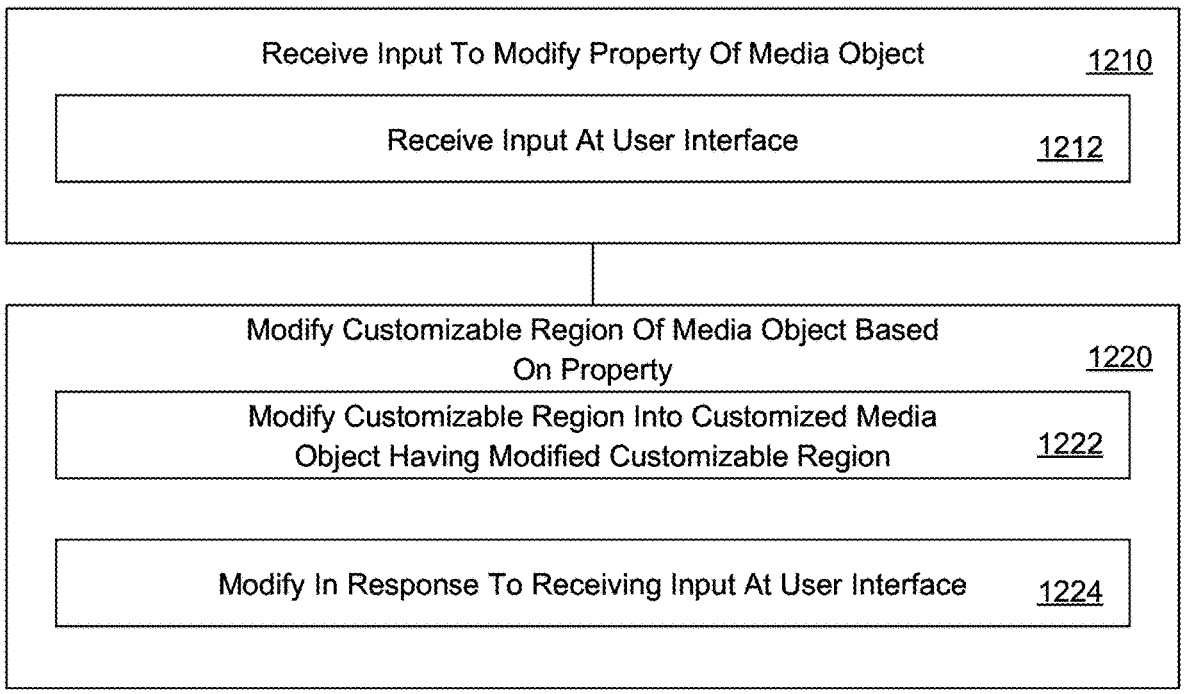
FIG. 12 depicts an example method of customizing media content via a user interface, in accordance with present implementations.

FIG. 12 depicts an example method of customizing media content via a user interface, in accordance with present implementations. At least system 100 can perform method 1200. At 1210, the method 1200 can receive input to modify a property of a media object. At 1212, the method 1200 can receive input at a user interface. At 1220, the method 1200 can modify the customizable region of the media object based on the property. At 1222, the method 1200 can modify the customizable region of media object, to obtain the customized media object having the modified customizable region. For example, the modified customized region can be the result of modification of the customizable region. At 1224, the method 1200 can modify the customizable region in response to receiving the input at the user interface.

For example, the method can include generating, by a machine learning model trained with input, which can include one or more of media data, the customizable region. For example, the machine learning model can be trained to identify one or more of a shape enclosed by one or more lines, a facial feature or portion thereof, a particular object in a frame, or any combination thereof. For example, the machine learning model can be trained to identify an eye, an iris, hair, or particular articles of clothing of a person or character depicted in media content. For example, the machine learning model can be trained to identify a person, a vehicle, a plant, an animal, text, characters, or any combination thereof, as a customizable or replaceable object in media content.

For example, the method can include modifying, based on a media feature transform definition, the customizable region. For example, the NFT can include a feature transform metric having the media feature transform definition. For example, the media feature transform definition can include a definition of one or more pixels or vectors of media content that can be customized. For example, the media feature transform definition can include a definition of one or more colors, patterns, shapes, or any combination thereof to or from which the media content can be customized.

For example, the method can include receiving, at a user interface, input to modify a property of a media object. The method can include modifying, in response to receiving the input at the user interface, the customizable region of the media object into the customized media object based on the property. The method can include modifying, in response to receiving the input at the user interface, the customizable region of the media object into the customized media object having the modified customizable region. For example, a property can correspond to but is not limited to, color, pattern, shape, text, or any combination thereof. For example, the method can include causing, in response to the modifying the customizable region of the media object based on the property, the user interface to present the card object can include the customized media object having the modified customizable region.

The herein described subject matter sometimes illustrates different components contained within, or connected with, different other components. It is to be understood that such depicted architectures are illustrative, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.).

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It will be further understood by those within the art that if a specific number of an introduced claim recitation is intended, such an intent will be explicitly recited in the claim, and in the absence of such recitation, no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general, such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

Further, unless otherwise noted, the use of the words "approximate," "about," "around," "substantially," etc., mean plus or minus ten percent.

The foregoing description of illustrative implementations has been presented for purposes of illustration and of description. It is not intended to be exhaustive or limiting with respect to the precise form disclosed, and modifications and variations are possible in light of the above teachings or may be acquired from practice of the disclosed implementations. It is intended that the scope of the invention be defined by the claims appended hereto and their equivalents.

Directional indicators depicted herein are example directions to facilitate understanding of the examples discussed herein, and are not limited to the directional indicators depicted herein. Any directional indicator depicted herein can be modified to the reverse direction, or can be modified to include both the depicted direction and a direction reverse to the depicted direction, unless stated otherwise herein. While operations are depicted in the drawings in a particular order, such operations are not required to be performed in the particular order shown or in sequential order, and all illustrated operations are not required to be performed. Actions described herein can be performed in a different order. Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Scope of the systems and methods described herein is thus indicated by the appended claims, rather than the foregoing description. The scope of the claims includes equivalents to the meaning and scope of the appended claims.

What is claimed is:

1. A method comprising:
modifying a customizable region of a media object into a customized media object having a modified customizable region, wherein the customizable region is a portion of the media object corresponding to modifiable pixels at particular coordinates within the media object;
generating, based on a card template having a portion compatible with the media object, a card object corresponding to the card template and including the customized media object embedded in the card object at a location corresponding to the portion of the card template;
generating, based on the card object, an NFT including a first identifier of the customized media object and a second identifier of the card template;
registering, based on the NFT, the card object to a user account via a block at a blockchain; and
linking the NFT with a wallet object corresponding to the user account.

2. The method of claim 1, further comprising:
selecting, based on a probability of selection corresponding to the media object or the template, the NFT; and
obtaining, in response to the selecting the NFT and based on the NFT, a second NFT.

3. The method of claim 2, further comprising:
registering, based on the second NFT, the second NFT to the user account via a second block at the blockchain; and
linking the second NFT to the wallet of the user account.

4. The method of claim 2, further comprising:
generating, based on one or more of the media object, the customizable region, and the card template, a probability metric indicating the probability of selection.

5. The method of claim 1, further comprising:
generating, by a machine learning model trained with input including one or more of media data, the customizable region.

6. The method of claim 1, the customizable region corresponding to a shape having one or more of a modifiable outline or a modifiable fill.

7. The method of claim 1, further comprising:
modifying, based on a media feature transform definition, the customizable region, the NFT including a feature transform metric having the media feature transform definition.

8. The method of claim 1, further comprising:
receiving, at a user interface, input to modify a property of a media object; and
modifying, in response to receiving the input at the user interface, the customizable region of the media object based on the property into the customized media object having the modified customizable region.

9. The method of claim 8, further comprising:
causing, in response to the modifying the customizable region of the media object based on the property, the user interface to present the card object including the customized media object having the modified customizable region.

10. A system comprising:
a non-transitory memory and one or more processors to:
modify a customizable region of a media object into a customized media object having a modified customizable region, wherein the customizable region is a portion of the media object corresponding to modifiable pixels at particular coordinates within the media object;
generate, based on a card template having a portion compatible with the media object, a card object corresponding to the card template and including the customized media object;

generate, based on the card object, an NFT including a first identifier of the customized media object and a second identifier of the card template;

register, based on the NFT, the card object to a user account via a block at a blockchain; and link the NFT with a wallet object corresponding to the user account.

11. The system of claim 10, the processors further to:

select, based on a probability of selection corresponding to the media object or the template, the NFT; and obtain, in response to the selecting the NFT and based on the NFT, a second NFT.

12. The system of claim 11, the processors further to:

register, based on the second NFT, the second NFT to the user account via a second block at the blockchain; and link the second NFT to the wallet of the user account.

13. The system of claim 11, the processors further to:

generate, based on one or more of the media object, the customizable region, and the card template, a probability metric indicating the probability of selection.

14. The system of claim 10, the processors further to:

generate, by a machine learning model trained with input including one or more of media data, the customizable region.

15. The system of claim 10, the customizable region corresponding to a shape having one or more of a modifiable outline or a modifiable fill.

16. The system of claim 10, the processors further to:

modify, based on a media feature transform definition, the customizable region, the NFT including a feature transform metric having the media feature transform definition.

17. The system of claim 10, the processors further to:

receive, at a user interface, input to modify a property of a media object; and modify, in response to receiving the input at the user interface, the customizable region of the media object based on the property into the customized media object having the modified customizable region.

18. The system of claim 10, the processors further to:

cause, in response to the modifying the customizable region of the media object based on the property, the user interface to present the card object including the customized media object having the modified customizable region.

19. A non-transitory computer readable medium including one or more instructions stored thereon and executable by a processor to:

modify, by a processor, a customizable region of a media object into a customized media object having a modified customizable region, wherein the customizable region is a portion of the media object corresponding to modifiable pixels at particular coordinates within the media object;

generate, by the processor and based on a card template having a portion compatible with the media object, a card object corresponding to the card template and including the customized media object;

generate, by the processor and based on the card object, an NFT including a first identifier of the customized media object and a second identifier of the card template;

register, by the processor and based on the NFT, the card object to a user account via a block at a blockchain; and link, by the processor, the NFT with a wallet object corresponding to the user account.

20. The computer readable medium of claim 19, wherein the computer readable medium further includes one or more instructions executable by the processor to:

receive, by the processor from a user interface, input to modify a property of a media object;

modify, by the processor in response to receiving the input at the user interface, the customizable region of the media object based on the property into the customized media object having the modified customizable region; and cause, by the processor in response to the modifying the customizable region of the media object based on the property, the user interface to present the card object including the customized media object having the modified customizable region.

* * * * *